US011102276B2

(12) United States Patent
Byron et al.

(10) Patent No.: US 11,102,276 B2
(45) Date of Patent: *Aug. 24, 2021

(54) SYSTEM AND METHOD FOR PROVIDING MORE APPROPRIATE QUESTION/ANSWER RESPONSES BASED UPON PROFILES

(71) Applicant: International Business Machines Corporation, Armonk, NY (US)

(72) Inventors: Donna K. Byron, Petersham, MA (US); Ashok Kumar, Chelmsford, MA (US); Mary D. Swift, Rochester, NY (US); Michael D. Whitley, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,036

(22) Filed: Jul. 11, 2019

(65) Prior Publication Data

US 2019/0334979 A1    Oct. 31, 2019

Related U.S. Application Data

(63) Continuation of application No. 14/641,954, filed on Mar. 9, 2015, now Pat. No. 10,462,211.

(51) Int. Cl.
*G06F 15/16* (2006.01)
*H04L 29/08* (2006.01)
(Continued)

(52) U.S. Cl.
CPC ............ *H04L 67/10* (2013.01); *G06F 16/345* (2019.01); *G06Q 10/101* (2013.01); *G06Q 50/01* (2013.01);
(Continued)

(58) Field of Classification Search
CPC ....... H04L 67/10; H04L 67/306; H04L 67/00; H04L 67/2838; G06F 16/345; G06Q 10/101; G06Q 50/01
See application file for complete search history.

(56) References Cited

U.S. PATENT DOCUMENTS 8,504,418 B1 *  8/2013  Dimock ............. G06Q 30/0239
                                                    705/14.19
8,738,617 B2    5/2014  Brown et al.
(Continued)

FOREIGN PATENT DOCUMENTS

WO      2014113869 A1    7/2014

*Primary Examiner* — Oleg Survillo
(74) *Attorney, Agent, or Firm* — Gavin Giraud

(57) ABSTRACT

A method, computer program product, and computer system for receiving, by a computing device, a question from a user. A first answer provided by a first subject matter expert is identified. A second answer provided by a second subject matter expert is identified. It is determined that a profile of the user matches a first profile of the first subject matter expert more than a second profile of the second subject matter expert. The first answer provided by the first subject matter expert is sent to the user with a preference over the second answer provided by the second subject matter expert based upon, at least in part, determining that the profile of the user matches the first profile of the first subject matter expert more than the second profile of the second subject matter expert.

17 Claims, 6 Drawing Sheets

(51) Int. Cl.
   *G06Q 50/00* (2012.01)
   *G06Q 10/10* (2012.01)
   *G06F 16/34* (2019.01)

(52) U.S. Cl.
   CPC .......... *H04L 67/00* (2013.01); *H04L 67/2838* (2013.01); *H04L 67/306* (2013.01)

(56) References Cited

U.S. PATENT DOCUMENTS

| | | |
|---|---|---|
| 9,396,236 B1 | 7/2016 | Vanderwater |
| 9,483,519 B2 | 11/2016 | Bastide |
| 2004/0260781 A1 | 12/2004 | Sliostack |
| 2008/0235005 A1 | 9/2008 | Golan |
| 2009/0070133 A1 | 3/2009 | Bonilla |
| 2009/0198666 A1 | 8/2009 | Winston |
| 2009/0287678 A1 | 11/2009 | Brown |
| 2010/0070554 A1* | 3/2010 | Richardson ............ G06Q 10/06 709/202 |
| 2010/0077032 A1 | 3/2010 | Drennan |
| 2010/0191686 A1* | 7/2010 | Wang ...................... G06F 16/33 706/46 |
| 2011/0110264 A1 | 5/2011 | Hu |
| 2013/0262453 A1 | 10/2013 | Lin |
| 2013/0282698 A1 | 10/2013 | Oztekin |
| 2013/0318118 A1 | 11/2013 | Amin |
| 2014/0032452 A1 | 1/2014 | Perkowitz et al. |
| 2014/0032572 A1 | 1/2014 | Eustice |
| 2014/0122383 A1 | 5/2014 | Shen et al. |
| 2014/0278363 A1 | 9/2014 | Allen |
| 2014/0280087 A1 | 9/2014 | Isensee et al. |
| 2016/0132590 A1 | 5/2016 | Byron |
| 2016/0170949 A1 | 6/2016 | Allen |
| 2016/0196298 A1 | 7/2016 | Bradley |

* cited by examiner

POSSIBLE ANSWERS:

1. "Insurance Benefits for Iraq War Veterans"

2. "Insurance Benefits for Post Traumatic Stress Disorder and Amputees"

3. ....

4. ....

5. "General Insurance Benefits for War Veterans"

6. "General Insurance Benefits for War Injuries"

7. ....

8. ....

9. "Insurance Benefits for Gulf War Veterans"

10. "Insurance Benefits for Gulf War Syndrome and Amyotrophic Lateral Sclerosis"

POSSIBLE ANSWERS:

1. "Insurance Benefits for Iraq War Veterans"

2. "Insurance Benefits for Post Traumatic Stress Disorder and Amputees"

3. ....

4. ....

5. "General Insurance Benefits for War Veterans"

6. "General Insurance Benefits for War Injuries"

SYSTEM AND METHOD FOR PROVIDING MORE APPROPRIATE QUESTION/ANSWER RESPONSES BASED UPON PROFILES

RELATED APPLICATIONS

The subject application is a continuation application of U.S. patent application Ser. No. 14/641,954, filed on Mar. 9, 2015, the entire contents of which are herein incorporated by reference.

BACKGROUND

Some traditional QA system may engage Subject Matter Experts (SMEs) to create the ground truth (candidate QA pairs) as part of QA system training. Generally, the process for this may have a unique set of questions that are given to each SME to create this set. In other systems, a collaborative model may be used where each SME is given the same questions and then through a group decision (e.g., voting) come up with the most popular answers that are used to create the set. However, there may be example situations where, e.g., there are two or more generally equally good answers that may vary depending on which end user is asking the question.

BRIEF SUMMARY OF DISCLOSURE

In one example implementation, a method, performed by one or more computing devices, may include but is not limited to receiving, by a computing device, a question from a user. A first answer provided by a first subject matter expert may be identified. A second answer provided by a second subject matter expert may be identified. It may be determined that a profile of the user matches a first profile of the first subject matter expert more than a second profile of the second subject matter expert. The first answer provided by the first subject matter expert may be sent to the user with a preference over the second answer provided by the second subject matter expert based upon, at least in part, determining that the profile of the user matches the first profile of the first subject matter expert more than the second profile of the second subject matter expert.

One or more of the following example features may be included. Determining that the profile of the user matches the first profile of the first subject matter expert more than the second profile of the second subject matter expert may include applying a weight to one or more features of the profile. Determining that the profile of the user matches the first profile of the first subject matter expert more than the second profile of the second subject matter expert may include comparing the profile of the user with the first profile of the first subject matter expert, and may include comparing the profile of the user with the second profile of the second subject matter expert. At least one of the user profile, the first profile, and the second profile may include a personality model. At least one of the user profile, the first profile, and the second profile may include an experience model. At least one of the user profile, the first profile, and the second profile may include a trait model. The preference may include a ranking of the first answer provided by the first subject matter expert higher than the second answer provided by the second subject matter expert.

In another example implementation, a computing system includes a processor and a memory configured to perform operations that may include but are not limited to receiving a question from a user. A first answer provided by a first subject matter expert may be identified. A second answer provided by a second subject matter expert may be identified. It may be determined that a profile of the user matches a first profile of the first subject matter expert more than a second profile of the second subject matter expert. The first answer provided by the first subject matter expert may be sent to the user with a preference over the second answer provided by the second subject matter expert based upon, at least in part, determining that the profile of the user matches the first profile of the first subject matter expert more than the second profile of the second subject matter expert.

One or more of the following example features may be included. Determining that the profile of the user matches the first profile of the first subject matter expert more than the second profile of the second subject matter expert may include applying a weight to one or more features of the profile. Determining that the profile of the user matches the first profile of the first subject matter expert more than the second profile of the second subject matter expert may include comparing the profile of the user with the first profile of the first subject matter expert, and may include comparing the profile of the user with the second profile of the second subject matter expert. At least one of the user profile, the first profile, and the second profile may include a personality model. At least one of the user profile, the first profile, and the second profile may include an experience model. At least one of the user profile, the first profile, and the second profile may include a trait model. The preference may include a ranking of the first answer provided by the first subject matter expert higher than the second answer provided by the second subject matter expert.

In another example implementation, a computer program product resides on a computer readable storage medium that has a plurality of instructions stored on it. When executed by a processor, the instructions cause the processor to perform operations that may include but are not limited to receiving a question from a user. A first answer provided by a first subject matter expert may be identified. A second answer provided by a second subject matter expert may be identified. It may be determined that a profile of the user matches a first profile of the first subject matter expert more than a second profile of the second subject matter expert. The first answer provided by the first subject matter expert may be sent to the user with a preference over the second answer provided by the second subject matter expert based upon, at least in part, determining that the profile of the user matches the first profile of the first subject matter expert more than the second profile of the second subject matter expert.

One or more of the following example features may be included. Determining that the profile of the user matches the first profile of the first subject matter expert more than the second profile of the second subject matter expert may include applying a weight to one or more features of the profile. Determining that the profile of the user matches the first profile of the first subject matter expert more than the second profile of the second subject matter expert may include comparing the profile of the user with the first profile of the first subject matter expert, and may include comparing the profile of the user with the second profile of the second subject matter expert. At least one of the user profile, the first profile, and the second profile may include a personality model. At least one of the user profile, the first profile, and the second profile may include an experience model. At least one of the user profile, the first profile, and the second profile may include a trait model. The preference may include a ranking of the first answer provided by the first subject matter expert higher than the second answer provided by the second subject matter expert.

The details of one or more example implementations are set forth in the accompanying drawings and the description below. Other features and advantages will become apparent from the description, the drawings, and the claims.

BRIEF DESCRIPTION OF THE DRAWINGS

FIG. 4 is an example diagrammatic view of a screen image displayed by the response process of FIG. 1 according to one or more example implementations of the disclosure;

FIG. 5 is an example diagrammatic view of a screen image displayed by the response process of FIG. 1 according to one or more example implementations of the disclosure.

Like reference symbols in the various drawings indicate like elements.

DETAILED DESCRIPTION

Figure 1:
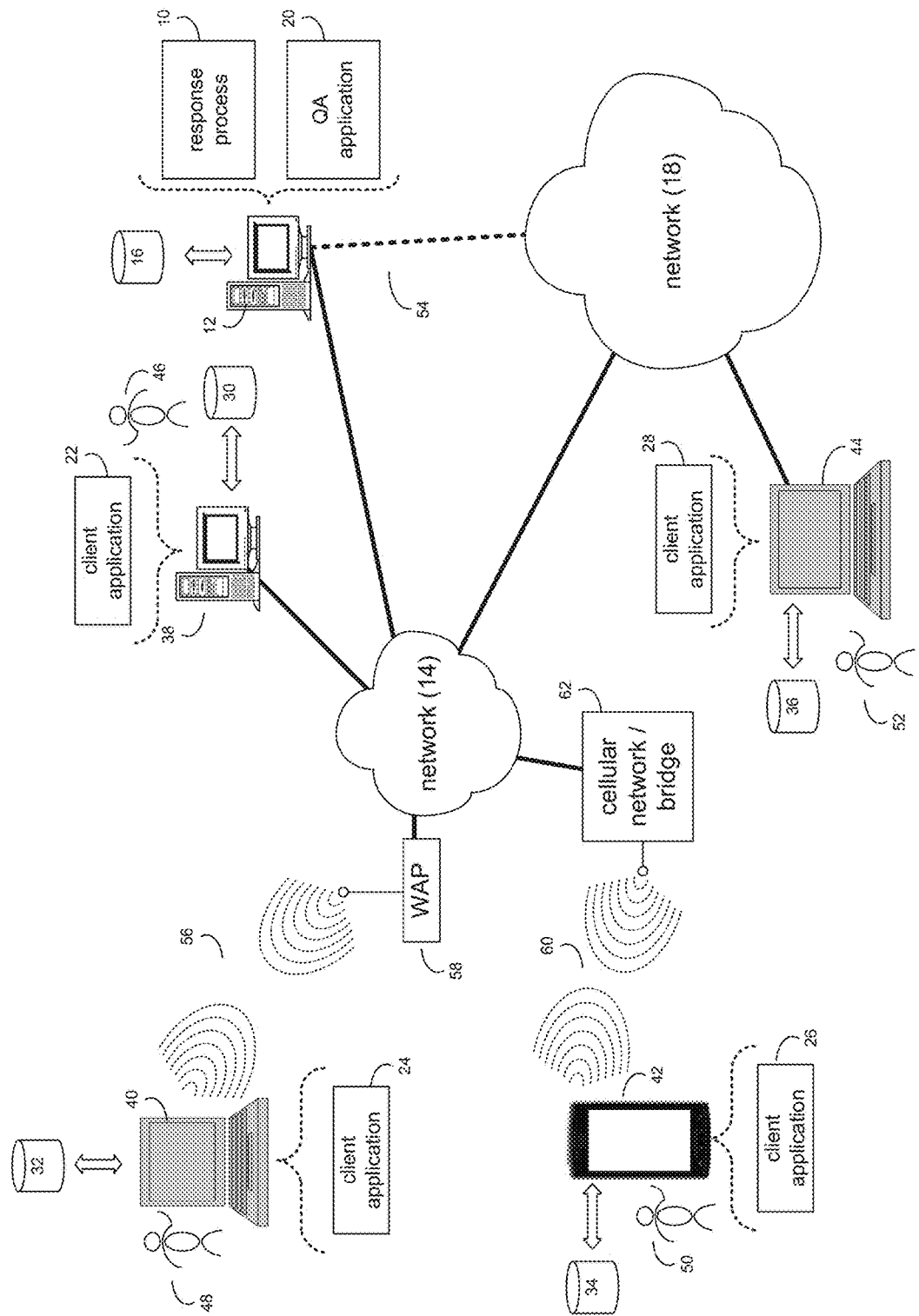
FIG. 1 is an example diagrammatic view of a response process coupled to a distributed computing network according to one or more example implementations of the disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown response process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, response process 10 may receive, by a computing device, a question from a user. A first answer provided by a first subject matter expert may be identified. A second answer provided by a second subject matter expert may be identified. It may be determined that a profile of the user matches a first profile of the first subject matter expert more than a second profile of the second subject matter expert. The first answer provided by the first subject matter expert may be sent to the user with a preference over the second answer provided by the second subject matter expert based upon, at least in part, determining that the profile of the user matches the first profile of the first subject matter expert more than the second profile of the second subject matter expert.

The instruction sets and subroutines of response process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Response process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a Question Answering (QA) system application, such as (e.g., QA application 20), examples of which may include, but are not limited to, e.g., the IBM Watson™ application or other QA application, a search engine application, a natural language processing (NLP) application, or other application that allows for the answering of questions posed by a user by querying stored information, e.g., in a data store. Response process 10 and/or QA application 20 may be accessed via client applications 22, 24, 26, 28. Response process 10 may be a stand alone application, or may be an applet/application/script/extension that may interact with and/or be executed within QA application 20, a component of QA application 20, and/or one or more of client applications 22, 24, 26, 28. QA application 20 may be a stand alone application, or may be an applet/application/script/extension that may interact with and/or be executed within response process 10, a component of response process 10, and/or one or more of client applications 22, 24, 26, 28. One or more of client applications 22, 24, 26, 28 may be a stand alone application, or may be an applet/application/script/extension that may interact with and/or be executed within and/or be a component of response process 10 and/or QA application 20. Examples of client applications 22, 24, 26, 28 may include, but are not limited to, e.g., the IBM Watson™ application or other QA application, a search engine application, a natural language processing (NLP) application, or other application that allows for the answering of questions posed by a user by querying stored information, e.g., in a data store, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of response process 10 (and vice versa). Accordingly, response process 10 may be a purely server-side application, a purely client-side application, or a hybrid server-side/client-side application that is cooperatively executed by one or more of client applications 22, 24, 26, 28 and/or response process 10.

One or more of client applications 22, 24, 26, 28 may be configured to effectuate some or all of the functionality of QA application 20 (and vice versa). Accordingly, QA application 20 may be a purely server-side application, a purely client-side application, or a hybrid server-side/client-side application that is cooperatively executed by one or more of client applications 22, 24, 26, 28 and/or QA application 20. As one or more of client applications 22, 24, 26, 28, response process 10, and QA application 20, taken singly or in any combination, may effectuate some or all of the same functionality, any description of effectuating such functionality via one or more of client applications 22, 24, 26, 28, response process 10, QA application 20, or combination thereof, and any described interaction(s) between one or more of client applications 22, 24, 26, 28, response process 10, QA application 20, or combination thereof to effectuate such functionality, should be taken as an example only and not to limit the scope of the disclosure.

Users 46, 48, 50, 52 may access computer 12 and response process 10 (e.g., using one or more of client electronic devices 38, 40, 42, 44) directly through network 14 or through secondary network 18. Further, computer 12 may be connected to network 14 through secondary network 18, as illustrated with phantom link line 54. Response process 10 may include one or more user interfaces, such as browsers and textual or graphical user interfaces, through which users 46, 48, 50, 52 may access response process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
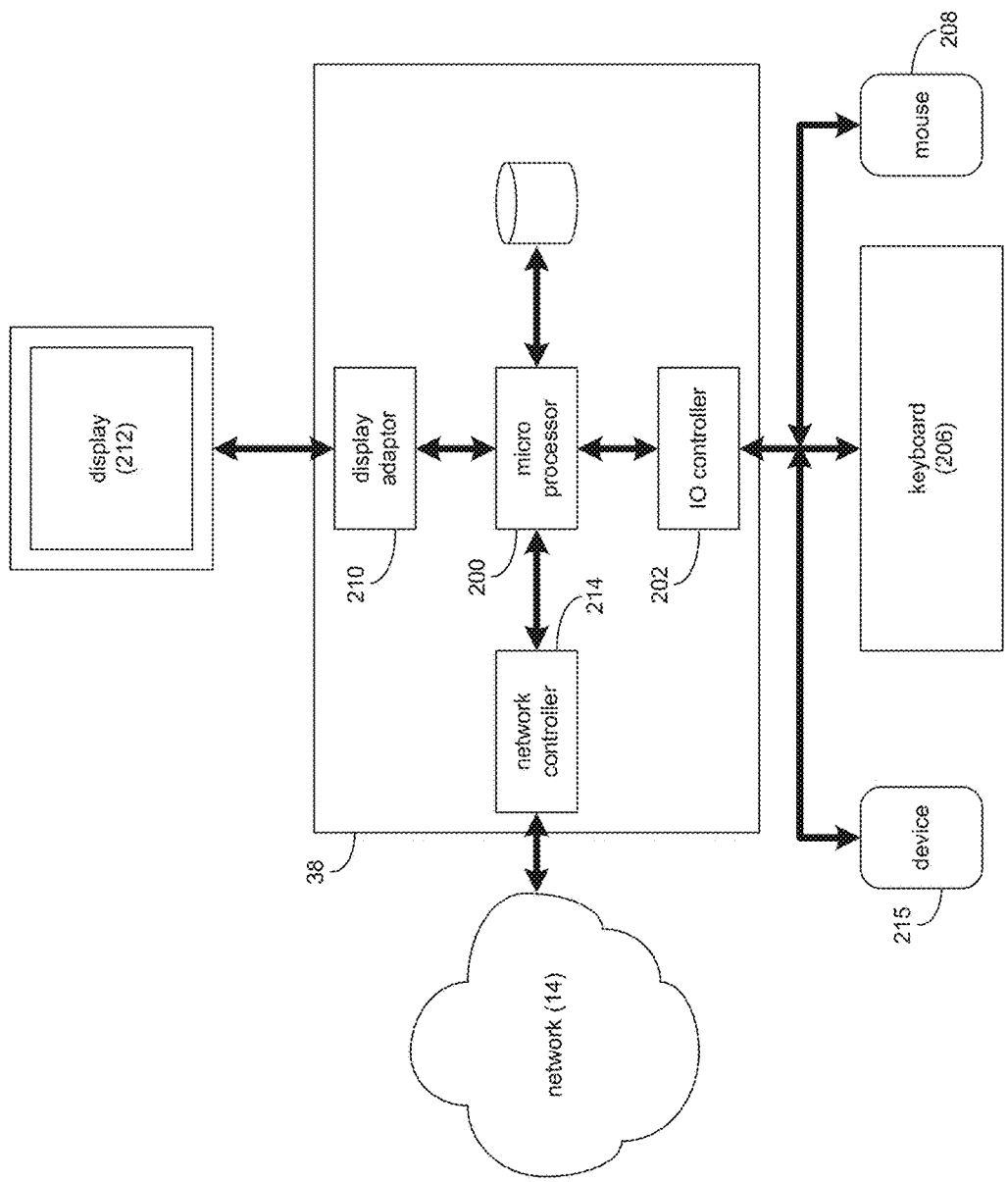
FIG. 2 is an example diagrammatic view of a client electronic device of FIG. 1 according to one or more example implementations of the disclosure.
Figure 3:
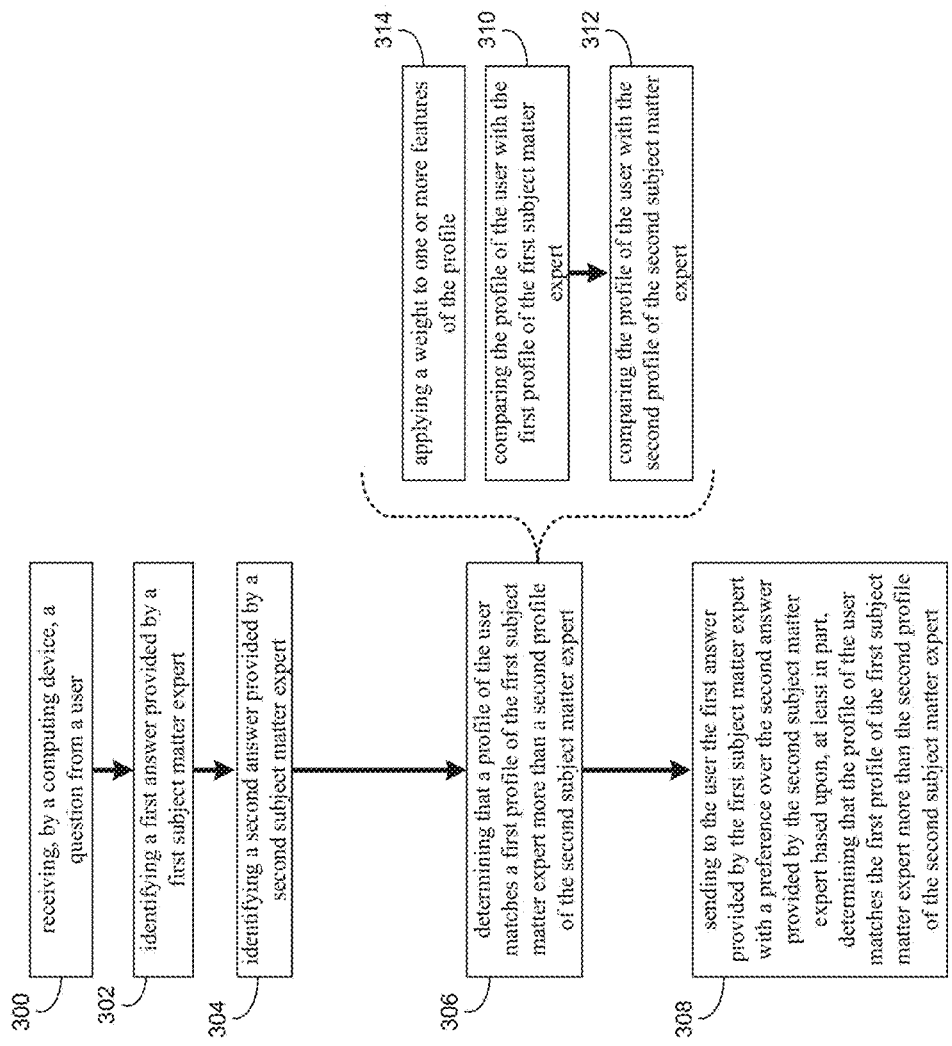
FIG. 3 is an example flowchart of the response process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, response process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Question Answering (QA) systems, such as the IBM Watson™ system, may include an application of advanced natural language processing, information retrieval, knowledge representation and reasoning, and machine learning technologies to the field of open domain question answering. The IBM Watson™ system may be built on IBM's DeepQA technology (or other compatible technology) used for hypothesis generation, massive evidence gathering, analysis, and scoring. The IBM Watson™ system may, for instance, take an input question, analyze it, decompose the question into constituent parts, generate one or more hypothesis based on the decomposed question and results of a primary search of answer sources, perform hypothesis and evidence scoring based on a retrieval of evidence from evidence sources, perform synthesis of the one or more hypothesis, and based on trained models, perform a final merging and ranking to output an answer to the input question along with a confidence measure.

Some traditional QA system may engage Subject Matter Experts (SMEs) to create the ground truth (candidate QA pairs) as part of QA system training. Generally, the process for this may have a unique set of questions that are given to each SME to create this set. In other systems, a collaborative model may be used where each SME is given the same questions and then through a group decision (e.g., voting) come up with the most popular answers that are used to create the set. However, there may be example situations where, e.g., there are 2 or more equally good answers that may vary depending on which end user is asking the question. This may be especially true in systems that may be deployed or targeted to a wide range of end customers (e.g., end users in different geographical regions with added challenge of cultural sensitivities, and/or end users that may belong to various age groups, such as GenX vs. Baby Boomers vs. Millennials, and/or a group of users that may have different work experience like veterans from the Vietnam War vs. the Gulf War).

The Response Process:

As discussed above and referring also at least to FIGS. 3-6, response process 10 may receive 300, by a computing device, a question from a user. Response process 10 may identify 302 a first answer provided by a first subject matter expert. Response process 10 may identify 304 a second answer provided by a second subject matter expert. Response process 10 may determine 306 that a profile of the user matches a first profile of the first subject matter expert more than a second profile of the second subject matter expert. Response process 10 may send 308 the first answer provided by the first subject matter expert to the user with a preference over the second answer provided by the second subject matter expert based upon, at least in part, determining 306 that the profile of the user matches the first profile of the first subject matter expert more than the second profile of the second subject matter expert.

As will be discussed below, in some implementations, response process 10 may be applied, e.g., at least during the Ground Truth creation, which may enable teaching or training QA application 20/response process 10 to identify cases where there may be equally valid answers, and provide influencing weight/score based on mapping Machine Models (e.g., which may reflect the features/attributes of the end user typically by using a Subject Matter Expert (SME) as the representative end user). Response process 10 may be useful in many situations, including when providing the "correct" answer also requires the most appropriate answer, e.g., when two users are asking the same question but from different personal, experiential, and/or geographical situations.

For instance, assume for example purposes only that a user (e.g., user 46) asks a question (e.g., via response process 10, QA application 20, client application 22, or combination thereof). In the example, assume the question is "What are insurance benefits and features for war veterans?". In the example, response process 10 may receive 300 the question from user 46.

In some implementations, response process 10 may create one or more profiles for one or more of the above-noted SMEs and/or user 46. For example, response process 10 may create certain models (e.g., targeted end user Personality/Experience/Trait (PET) models). The personality portion of the PET model may indicate such things as, e.g., psychological attributes, altruism, excitability, generosity, openness, imaginative, political, sympathetic, modest, cheerfulness, etc. The experience portion of the PET model may indicate, e.g., profession, work experience, military service, participation in past events, resumes, geographic location, etc. The trait portion of the PET model may indicate, e.g., social network behavior, shopping habits, culture, demographics, hobbies, etc. In some implementations, response process 10 may gather this information about user 46 and/or the SMEs from various sources (e.g., from registration data, social media profile information, blogs, etc., or any other publically available information). It will be appreciated that other models may be used without departing from the scope of the disclosure.

In some implementations, as will be discussed below, e.g., during the above-noted training, each feature/attribute may be considered as a ranking factor, where the SMEs (assuming they do represent one or more of these features) may be creating training sets that are attached with the above features/attributes as a key determinant. Hence, as will be discussed below, the same question may be mapped to different answers based on which profile attribute is given more weight. As will be appreciated, more complex models having numerous attributes with interdependent correlations may be created with a range of weights that may affect the end answer. As will be discussed below, when such a trained system is deployed by response process 10, an end user (e.g., user 46) may be classified based on available information, and once the set of answers are generated, response process 10 may do a mapping of user 46 to one of the trained PET models and based on that, rank the related answers higher leading to a "Most Relevant Answer" for user 46.

As will be discussed below, in some implementations, if at least one of the SMEs is a real representative of the targeted end user (e.g., user 46 who is asking the question), response process 10 may automatically create the models from that particular SME's profile. If at least one of the SMEs are not real representatives of user 46, response process 10 may create the appropriate PET model manually based on, e.g., the application domain, by generating features/weights that may be part of that PET model which may affect the final ranking or prioritizing of the answers.

For instance, and continuing with the above example, assume for example purposes only that response process 10 has created a profile (e.g., PET profile) for user 46, which indicates an example attribute that user 46 is a veteran of the Iraq war. Further assume that response process 10 has created a PET profile for a first SME, which indicates an example attribute that the first SME was also a veteran of the Iraq war. Further assume that response process 10 has created a PET profile for a second SME, which indicates an example attribute that the second SME was a veteran of the Gulf war. The nature of the priorities in terms of insurance benefits and features may be different in each case. Thus, when response process 10 creates each PET model, different characteristics may be considered. For instance, the described example may consider a slightly complex characteristic as the consideration of which is the nature of injuries or health issues based on each war.

In some implementations, response process 10 may identify 302 a first answer provided by the first SME. For example, recall that the first SME has a PET model that indicates an example attribute that the first SME was also a veteran of the Iraq war. In the example, the answer to "what are insurance benefits and features for war veterans?" provided by the first SME may include particularly relevant information about insurance benefits and features for Iraq war veterans (e.g., information about insurance benefits and features for post traumatic stress disorder combined with amputations).

In some implementations, response process 10 may identify 304 a second answer provided by a second subject matter expert. For example, recall that the second SME has a PET model that indicates an example attribute that the second SME was a veteran of the Gulf war. In the example, the answer to "what are insurance benefits and features for war veterans?" provided by the second SME may include particularly relevant information about insurance benefits and features for Gulf war veterans (e.g., information about insurance benefits and features for an unexplained illness known as "Gulf War Syndrome" and Amyotrophic Lateral Sclerosis).

In some implementations, response process 10 may determine 306 that a profile of the user matches a first profile of the first subject matter expert more than a second profile of the second subject matter expert. For instance, and continuing with the above example, further assume that response process 10 has generated a profile for user 46 that indicates an example attribute that user 46 was a veteran of the Iraq war.

In some implementations, determining 306 that the profile of the user matches the first profile of the first subject matter expert more than the second profile of the second subject matter expert may include response process 10 comparing 310 the profile of the user with the first profile of the first subject matter expert, and may include comparing 312 the profile of the user with the second profile of the second subject matter expert. For example, response process 10 may compare 310 the profile of user 46 with the profile of the first SME, and may compare 312 the profile of user 46 with the profile of the second SME. As noted above, both the profile of user 46 and the profile of the first SME share a common feature/attribute of having served in the Iraq war. As such, in the example, response process 10 may determine 306 that the profile of user 46 matches the profile of the first SME more than the profile of the second SME.

It will be appreciated that while the disclosure is described using 2 SME's with different professional experiences, other example feature/attributes may be used as well without departing from the scope of the disclosure. For instance, in some implementations, the SMEs may be from different cultural backgrounds, and therefore may each express equally "correct" answers, but with a culturally-attuned sensitivity to politeness, social protocol, regional dialect, etc. For example, a third and fourth SME may both work in the same role for the same company (e.g., telecomm solution architect, insurance underwriter, etc.) but one may live in Japan and one may live in the US. In the example, assume further that a profile of a third SME shows the third SME lives in Japan and the fourth SME lives in the US (and both work for the same telecomm solution architect company). In the example, assuming for example purposes only that a profile of user 48 indicates that user 48 lives in Japan, response process 10 may compare 310 the profile of user 48 with the profile of the third SME, and may compare 312 the profile of user 48 with the profile of the fourth SME. As noted above, both the profile of user 48 and the profile of the third SME share a common feature/attribute of living in Japan. As such, in the example, response process 10 may determine 306 that the profile of user 48 matches the profile of the third SME more than the profile of the fourth SME. As such, the use of the particular feature/attributes being professional experiences should be taken as an example only and not to limit the scope of the disclosure.

It will be appreciated that the use of only focusing on a single attribute in a profile is for simplicity purposes only and should not be taken to limit the scope of the disclosure. For example, each profile may include multiple attributes that may be used to determine 306 which SME's profile better matches the profile of user 46. For example, determining 306 that the profile of the user matches the first profile of the first subject matter expert more than the second profile of the second subject matter expert may include response process 10 applying 314 a weight to one or more features of the profile. For instance, as noted above, at least one of the user profile, the first profile, and the second profile may include a personality model. At least one of the user profile, the first profile, and the second profile may include an experience model. At least one of the user profile, the first profile, and the second profile may include a trait model. As also noted above, the personality portion of the PET model may indicate such things as, e.g., altruism, excitability, generosity, openness, imaginative, political, sympathetic, modest, cheerfulness, etc. The experience portion of the PET model may indicate, e.g., profession, work experience, military service, resumes, geographic location, etc. The trait portion of the PET model may indicate, e.g., social network behavior, shopping habits, culture, etc.

As such, assume for example purposes only that the profile of user 46 includes altruism, Iraq war veteran, and activity on gardening social media pages. Further assume that the profile for the first SME includes generosity, Iraq war veteran, and activity on model plane design social media pages, while the profile for the second SME includes cheerfulness, Gulf war veteran, and activity on gardening social media pages. In the example, further assume that response process 10 has placed a higher weight on the feature trait portion of the profile for user 46 (e.g., Iraq war veteran), and a lower weight on the remaining feature portions. As such, in the example, because the higher weight is placed on the trait portion (which is matched to the second SME's profile), rather than the experience portion (which is matched to the first SME's profile), response process 10 may determine 306 that the profile of user 46 matches the profile of the second SME more than the profile of the first SME. As such, any combination of profile features may be used (with or without weights) without departing from the scope of the disclosure. In some implementations, the weight may be applied 314 to each feature/attribute based upon correlation. For example, as the above-noted question includes the terms "war" or "veterans", response process 10 may automatically apply 314 a higher weight to the feature/attribute "military service" experience portion, since there may be a correlation between the terms "war" or "veterans" and "Iraq veteran". It will be appreciated that other techniques to determine the appropriate weight may be used without departing from the scope of the disclosure.

In some implementations, response process 10 may send 308 the first answer provided by the first subject matter expert to the user with a preference over the second answer provided by the second subject matter expert based upon, at least in part, determining 306 that the profile of the user matches the first profile of the first subject matter expert more than the second profile of the second subject matter expert. For instance, using the above-noted ground truth training along with the mapped PET Models, when user 46 asks the above-noted question, response process 10 may generate a real-time PET Model for user 46 from their profile. In some implementations, this may require a combination of NLP/Machine Models. Once response process 10 comes up with the candidate set of answers that have a mapping to pre-trained PET models, during the answer-scoring/merging, the "real" Pet Model from user 46 may be taken into consideration to provide a higher score for answers that may have a near match with the mapped PET MODELS. This may enable the output answers that match or are more relevant to user 46 to be sent 308. As such, response process 10 may utilize the concurrence/similarity of attributes between the profile of user 46 and the profile of the SME's with similar or parallel attributes as an additional information stream when scoring/ranking candidate answers.

For instance, continuing with the above example, recall that the answer to "what are insurance benefits and features for war veterans?" provided by the first SME may include particularly relevant information about insurance benefits and features for Iraq war veterans (e.g., information about insurance benefits and features for post traumatic stress disorder combined with amputations), as the first SME's profile includes the attribute of having served in the Iraq war, and further recall that the answer to "what are insurance benefits and features for war veterans?" provided by the second SME may include particularly relevant information about insurance benefits and features for Gulf war veterans (e.g., information about insurance benefits and features for an unexplained illness known as "Gulf War Syndrome" and Amyotrophic Lateral Sclerosis), as the second SME's profile includes the attribute of having served in the Gulf war. Thus, in the example, because response process 10 has determined 306 that the profile of user 46 matches the profile of the first SME more than the second SME, response process 10 may send 308 to user 46 the answer provided by the first subject matter expert (e.g., particularly relevant information about insurance benefits and features for Iraq war veterans for post traumatic stress disorder combined with amputations) with a preference over sending to user 46 the second answer provided by the second subject matter expert (e.g., particularly relevant information about insurance benefits and features for Gulf war veterans for an unexplained illness known as "Gulf War Syndrome" and Amyotrophic Lateral Sclerosis). As such, in the example, the first SME's answer may be equally as accurate as the second SME's answer, however, the first SME's answer may be more appropriate for user 46 than the second SME's answer. In the example, during the Ground Truth creation, if the SMEs are coming up with answers that are different, but equally relevant based on who is asking the question, response process 10 may map the SME's to a particular PET Model (e.g., mapping the first SME to an Iraq war based PET Model and mapping the second SME to a Gulf war based PET Model).

Conversely, assume for example purposes only that another user (e.g., user 48) asks response process 10 the same question, where response process 10 has generated a profile for user 48 that indicates an example attribute that user 48 was a veteran of the Gulf war. In the example, even though the same question was asked, response process 10 may send 308 to user 48 the answer provided by the second subject matter expert (e.g., particularly relevant information about insurance benefits and features for Gulf war veterans for an unexplained illness known as "Gulf War Syndrome" and Amyotrophic Lateral Sclerosis) with a preference over sending to user 46 the answer provided by the first subject matter expert (e.g., particularly relevant information about insurance benefits and features for Iraq war veterans for post traumatic stress disorder combined with amputations). As such, in the example, the second SME's answer may be equally as accurate as the first SME's answer, however, the second SME's answer may be more appropriate for user 48 than the first SME's answer.

In some implementations, the preference may include a ranking of the first answer provided by the first subject matter expert higher than the second answer provided by the second subject matter expert. For instance, referring at least to FIG. 4, and continuing with the example where the above-noted question is asked by user 46, response process 10 may send 308 to user 46 a list of answers (e.g., with supporting reference documents) for both the first SME's answers and the second SME's answers. In the example, the answers provided by the first SME may be ranked higher than the answers provided by the second SME. The list is shown via an example user interface 400 associated with response process 10 on display 212. It will be appreciated that response process 10 may send 308 the answers in any format using any known technique, such as email, text, web page, etc.

It will be appreciated that ranking of the first answer provided by the first subject matter expert higher than the second answer provided by the second subject matter expert may include response process 10 only sending 308 the answers provided by the first SME without sending the answers provided by the second SME. For instance, and referring at least to FIG. 5, response process 10 may send 308 to user 46 a list of answers (e.g., with supporting reference documents) for the first SME's answers without sending 308 the second SME's answers. In some implementations, general answers provided by other SMEs may also be displayed. In the example, the answers provided by the first SME may be ranked higher than the answers provided by the "general" SME. For example, in a generalized system (e.g., without a mapped SME), the question from user 46 may simply result in a list of general answers with supporting reference documents for general inpatient and outpatient services. As such, in the example, general answers may still be sent to user 46 along with (but with a lower rank than) the answers provided by the first SME. The list is shown via an example user interface 500 associated with response process 10 on display 212. It will be appreciated that any method of sending 308, displaying and/or ranking answers may be used without departing from the scope of the disclosure.

Figure 6:
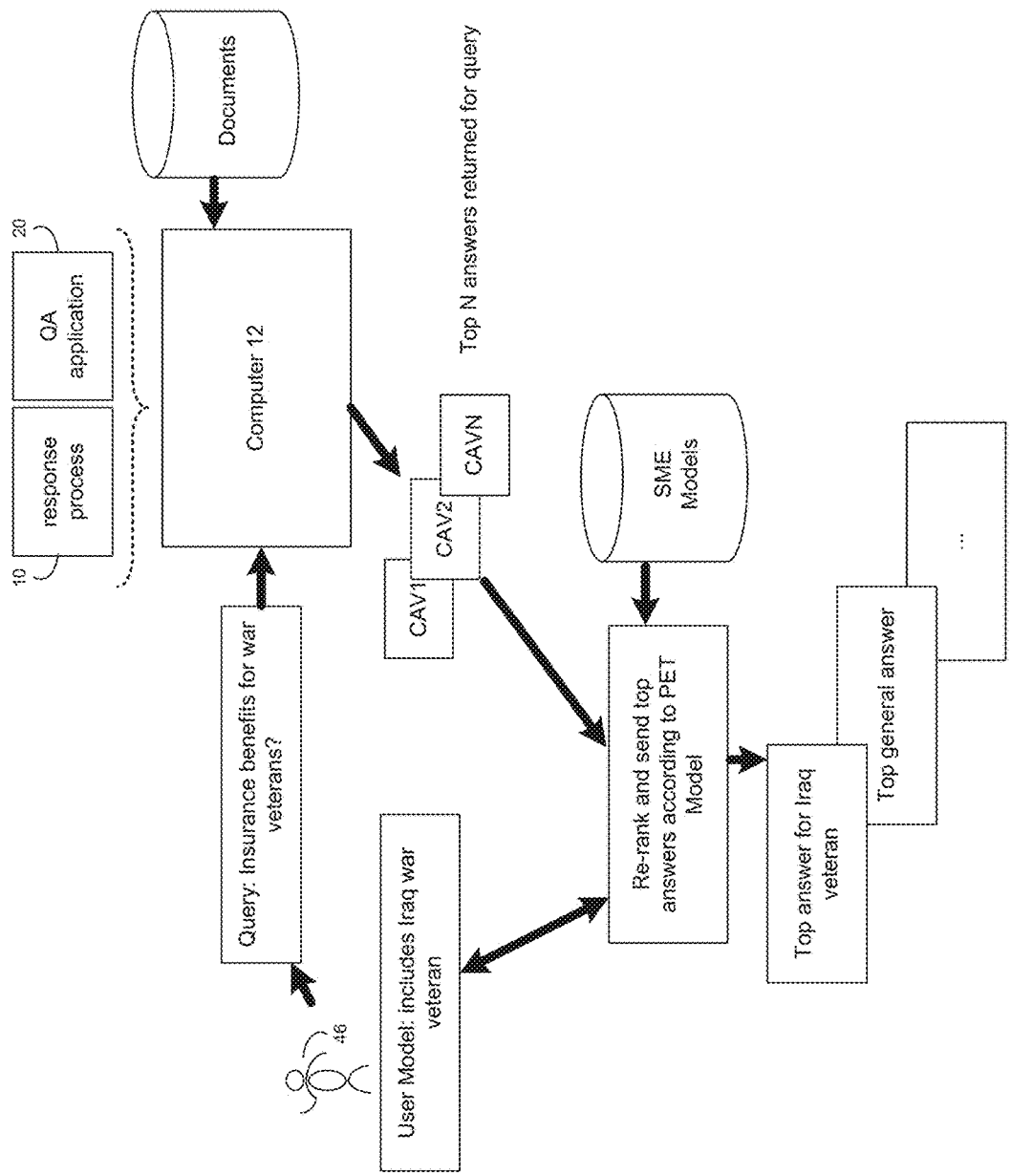
FIG. 6 is an example diagrammatic view of the response process of FIG. 1 according to one or more example implementations of the disclosure.

In some implementations, and referring at least to FIG. 6, response process 10 may determine the top answers to user 46's question (as may be done in conventional QA systems without mapped SMEs). After determining the top answers, response process 10 may then rank or re-rank the top answers according to the above-noted PET model and select procedures that may be most appropriate, which may then be sent 308 to user 46.

It will be appreciated that while the disclosure is described using a QA system, response process 10 may be adapted to work with any example answer query/response systems (e.g., conventional data store or Internet search engines). As such, the use of a QA system should be taken as example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   receiving, by a computing device, a question from a user;
   generating, after the question is received, a real-time Personality/Experience/Trait (PET) Model from a profile of the user;
   identifying a first answer provided by a first subject matter expert;
   identifying a second answer provided by a second subject matter expert;
   mapping, after the first answer and the second answer are identified, the user to at least one trained PET Model created by the at least one of the first subject matter expert and the second subject matter expert;
   determining that a profile of the user matches a first profile of the first subject matter expert more than a second profile of the second subject matter expert, wherein determining that the profile of the user matches the first profile of the first subject matter expert more than the second profile of the second subject matter expert includes:
      applying a weight to one or more features of the profile of the user, the first profile of the first subject matter expert, and the second profile of the second subject matter expert, wherein applying the weight to the one or more features is based upon, at least in part, determining a correlation between the one or more features of the profile of the user and the first profile of the first subject matter expert, wherein applying the weigh to the one or more features of the profile is determined based upon a similarity of attributes between the real-time PET Model relative to the user and the trained PET Model relative to the at least on subject matter expert; and
      upon determining the correlation between the one or more features of the profile of the user and the first profile of the first subject matter expert, applying a higher weight to the one or more features having the correlation between the profile of the user and the profile of the first subject matter expert; and
   sending to the user the first answer provided by the first subject matter expert with a preference over the second answer provided by the second subject matter expert based upon, at least in part, determining that the profile of the user matches the first profile of the first subject matter expert more than the second profile of the second subject matter expert, wherein the first answer provided by the first subject matter expert is more appropriate than the second answer provided by the second subject matter expert based upon the correlation between the one or more features of the profile of the user and the first profile of the first subject matter expert.

2. The computer-implemented method of claim 1 wherein determining that the profile of the user matches the first profile of the first subject matter expert more than the second profile of the second subject matter expert includes:
   comparing the profile of the user with the first profile of the first subject matter expert; and
   comparing the profile of the user with the second profile of the second subject matter expert.

3. The computer-implemented method of claim 2 wherein at least one of the user profile, the first profile, and the second profile includes a personality model.

4. The computer-implemented method of claim 2 wherein at least one of the user profile, the first profile, and the second profile includes an experience model.

5. The computer-implemented method of claim 2 wherein at least one of the user profile, the first profile, and the second profile includes a trait model.

6. The computer-implemented method of claim 1 wherein the preference includes a ranking of the first answer provided by the first subject matter expert higher than the second answer provided by the second subject matter expert.

7. A computer program product residing on a non-transitory computer readable storage medium having a plurality of instructions stored thereon which, when executed by a processor, cause the processor to perform operations comprising:
   receiving a question from a user;
   generating, after the question is received, a real-time Personality/Experience/Trait (PET) Model from a profile of the user;
   identifying a first answer provided by a first subject matter expert;
   identifying a second answer provided by a second subject matter expert;
   mapping, after the first answer and the second answer are identified, the user to at least one trained PET Model created by the at least one of the first subject matter expert and the second subject matter expert;
   determining that a profile of the user matches a first profile of the first subject matter expert more than a second profile of the second subject matter expert, wherein determining that the profile of the user matches the first profile of the first subject matter expert more than the second profile of the second subject matter expert includes:
      applying a weight to one or more features of the profile of the user, the first profile of the first subject matter expert, and the second profile of the second subject matter expert, wherein applying the weight to the one or more features is based upon, at least in part, determining a correlation between the one or more features of the profile of the user and the first profile of the first subject matter expert, wherein applying the weigh to the one or more features of the profile is determined based upon a similarity of attributes between the real-time PET Model relative to the user and the trained PET Model relative to the at least on subject matter expert; and
      upon determining the correlation between the one or more features of the profile of the user and the first profile of the first subject matter expert, applying a higher weight to the one or more features having the correlation between the profile of the user and the profile of the first subject matter expert; and
   sending to the user the first answer provided by the first subject matter expert with a preference over the second answer provided by the second subject matter expert based upon, at least in part, determining that the profile of the user matches the first profile of the first subject matter expert more than the second profile of the second subject matter expert, wherein the first answer provided by the first subject matter expert is more appropriate than the second answer provided by the second subject matter expert based upon the correlation between the one or more features of the profile of the user and the first profile of the first subject matter expert.

8. The computer program product of claim 7 wherein determining that the profile of the user matches the first profile of the first subject matter expert more than the second profile of the second subject matter expert includes:
   comparing the profile of the user with the first profile of the first subject matter expert; and
   comparing the profile of the user with the second profile of the second subject matter expert.

9. The computer program product of claim 8 wherein at least one of the user profile, the first profile, and the second profile includes a personality model.

10. The computer program product of claim 8 wherein at least one of the user profile, the first profile, and the second profile includes an experience model.

11. The computer program product of claim 8 wherein at least one of the user profile, the first profile, and the second profile includes a trait model.

12. The computer program product of claim 7 wherein the preference includes a ranking of the first answer provided by the first subject matter expert higher than the second answer provided by the second subject matter expert.

13. A computing system including a processor and a memory configured to perform operations comprising:
   receiving a question from a user;
   generating, after the question is received, a real-time Personality/Experience/Trait (PET) Model from a profile of the user;
   identifying a first answer provided by a first subject matter expert;
   identifying a second answer provided by a second subject matter expert;
   mapping, after the first answer and the second answer are identified, the user to at least one trained PET Model created by the at least one of the first subject matter expert and the second subject matter expert;
   determining that a profile of the user matches a first profile of the first subject matter expert more than a second profile of the second subject matter expert, wherein determining that the profile of the user matches the first profile of the first subject matter expert more than the second profile of the second subject matter expert includes:
   applying a weight to one or more features of the profile of the user, the first profile of the first subject matter expert, and the second profile of the second subject matter expert, wherein applying the weight to the one or more features is based upon, at least in part, determining a correlation between the one or more features of the profile of the user and the first profile of the first subject matter expert, wherein applying the weigh to the one or more features of the profile is determined based upon a similarity of attributes between the real-time PET Model relative to the user and the trained PET Model relative to the at least on subject matter expert; and
   upon determining the correlation between the one or more features of the profile of the user and the first profile of the first subject matter expert, applying a higher weight to the one or more features having the correlation between the profile of the user and the profile of the first subject matter expert; and
   sending to the user the first answer provided by the first subject matter expert with a preference over the second answer provided by the second subject matter expert based upon, at least in part, determining that the profile of the user matches the first profile of the first subject matter expert more than the second profile of the second subject matter expert, wherein the first answer provided by the first subject matter expert is more appropriate than the second answer provided by the second subject matter expert based upon the correlation between the one or more features of the profile of the user and the first profile of the first subject matter expert.

14. The computing system of claim 13 wherein determining that the profile of the user matches the first profile of the first subject matter expert more than the second profile of the second subject matter expert includes:
   comparing the profile of the user with the first profile of the first subject matter expert; and
   comparing the profile of the user with the second profile of the second subject matter expert.

15. The computing system of claim 14 wherein at least one of the user profile, the first profile, and the second profile includes a personality model.

16. The computing system of claim 14 wherein at least one of the user profile, the first profile, and the second profile includes an experience model.

17. The computing system of claim 14 wherein at least one of the user profile, the first profile, and the second profile includes a trait model.

* * * * *